United States Patent [19]

Guckel et al.

[11] Patent Number: 5,338,085
[45] Date of Patent: Aug. 16, 1994

[54] FOLDING TOP FOR MOTOR VEHICLES

[75] Inventors: Martin Guckel, Wiernsheim; Jürgen Schrader, Weil im Schönbuch; Bernd Wilms, Holzgerlingen, all of Fed. Rep. of Germany

[73] Assignee: Mercedes-Benz AG, Stuttgart, Fed. Rep. of Germany

[21] Appl. No.: 64,641

[22] Filed: May 21, 1993

[30] Foreign Application Priority Data

May 28, 1992 [DE] Fed. Rep. of Germany ....... 4217636

[51] Int. Cl.$^5$ .................................... B60J 7/12
[52] U.S. Cl. .................... 296/121; 296/116; 296/118
[58] Field of Search ............ 296/107, 116, 118, 120.1, 296/121, 122, 128

[56] References Cited

U.S. PATENT DOCUMENTS 4,936,626 6/1990 Gmeiner et al. .................... 296/108

FOREIGN PATENT DOCUMENTS

| 0351378 | 1/1990 | European Pat. Off. |
| 1223070 | 11/1968 | Fed. Rep. of Germany |
| 3724531 | 12/1988 | Fed. Rep. of Germany ...... 296/121 |
| 3937764 | 12/1990 | Fed. Rep. of Germany ...... 296/107 |
| 4129493 | 8/1992 | Fed. Rep. of Germany |
| 548569 | 9/1956 | Italy ..................... 296/108 |

*Primary Examiner*—Dennis H. Pedder
*Attorney, Agent, or Firm*—Evenson, McKeown, Edwards & Lenahan

[57] ABSTRACT

The invention relates to a folding top for motor vehicles, having a top frame which comprises lateral top supports and a rear hoop. The top has a storage position of the top in an associated top box, into which it can be lowered by folding back the upright top supports about a main axis. The top frame has an articulation, spaced relative to the main axis, of the lateral legs of the rear hoop on the frame members which are jointly moved via the top supports, whereby the rear hoop is displaced backwards relative to the main axis during the lowering process, and having a rearward widening of the top box behind the top box aperture into which the rear hoop projects when the top is lowered. In order that incorrect operation during manual lowering of the top should be reliably prevented, the top supports of the top are retained, when the rear hoop is upright, via locking devices which prevent their folding-back movement and whose locking action can be cancelled by an advance rearward pivoting movement of the rear hoop, the pivot angle of the advance being such that, when the top supports are subsequently folded back, contact-free dipping of the rear hoop through the top box aperture is guaranteed.

10 Claims, 2 Drawing Sheets

FOLDING TOP FOR MOTOR VEHICLES

BACKGROUND AND SUMMARY OF THE INVENTION

The invention relates to a folding top for motor vehicles of the type having a top frame which comprises lateral top supports and a rear hoop, having a storage position of the top in an associated top box, into which it can be lowered by folding back the upright top supports about a main axis, having an articulation, spaced relative to the main axis, of the lateral legs of the rear hoop on the frame members which are jointly moved via the top supports, whereby the rear hoop is displaced backwards relative to the main axis during the lowering process, and having a rearward widening of the top box behind the top box aperture, into which the rear hoop projects when the top is lowered.

Such a folding top is already to be found as known in, for example, Patent Application P 41 29 493.921, the lateral legs of the rear hoop being articulated on the assigned top support at a substantial distance from the main pivot axis of the top. Because of this articulation, the rear hoop, during the process of lowering of the top, executes a pivoting movement, upon which a rearward displacement movement is superimposed. For design reasons, the aperture of the top box is arranged so that the rear hoop can only be folded into the latter if, before the folding-back of the top supports, it has been folded down out of its upright intermediate position into a lowered pivot position. When the top supports are subsequently folded back, it dips through the top box aperture and finds the space for further backward displacement in the top box itself, because the rear wall of the top box is correspondingly recessed rearwards within the top box aperture.

If this intended folding sequence is not followed, for example by an unskilled operator, and the top is moved back while the rear hoop is still erected, the rear hoop fails to fit through the top box aperture and impacts on the bodywork.

Apart from the fact that the process of lowering of the top cannot thus be readily completed, energetic rearward movement of the top may even cause damage to the top itself or to the parts of the bodywork on which impact takes place.

An object of the invention is therefore the further development of a folding top of the generic type, whereby incorrect operation during manual lowering of the top into the top box as a result of nonobservance of the intended sequence for folding the top supports and rear hoop can be prevented with adequate reliability.

This object is achieved by providing preferred embodiments of the invention according to an arrangement wherein the top supports of the top are retained, when the rear hoop is upright, via locking devices which prevent their folding-back movement and whose locking action can be cancelled by an advance rearward pivoting movement of the rear hoop, the pivot angle of the advance being such that, when the top supports are subsequently folded back, contact-free dipping of the rear hoop through the top box aperture is guaranteed.

A particularly reliable procedure control can be achieved according to certain preferred embodiments by means of a locking mechanism as a blocking means which is automatically unlocked, purely mechanically, via the rearward pivoting movement of the rear hoop.

A particularly favorable locking mechanism, in terms of cost and weight, comprises a pivot member mounted on the top support which, in the locked state, interacts with a retaining component by engaging behind it and can be unlocked via the advance pivoting movement of the rear hoop. In this arrangement, any conventional transmission means, such as a cable with return springs, rams with return springs, etc., are suitable for linking the movements of the pivot member and rear hoop.

A particularly expedient transmission means is provided in certain preferred embodiments, including a lever which is resistant to tensile and compressive forces, is connected in an articulated manner to the assigned leg of the rear hoop, and can drive the pivot member in both the locking direction and the unlocking direction. Thus it is possible to dispense completely with a return spring. Such a lever could be, for example, a connecting rod.

In order to permit a particularly compact arrangement or design of the locking mechanism, the pivot member is designed as a two-armed lever and the rearward projecting lever arm forms the lever which is articulated by its end on the associated leg of the rear hoop.

In respect of production engineering aspects and for the purposes of simplified retrofitting of the locking mechanism, it is advantageous if the bearing point for the articulation of the lateral legs of the rear hoop, which is necessary in any event, is also used for mounting the pivot member.

In order to engage behind the retaining component, the pivot member is preferably provided with a hook-shaped end region which acts as a catch coupling and can thus be moved as far away as desired from the retaining component in the unlocking direction. Moreover, as a result of appropriate sizing of the extent of the hook, unlocking can be ensured after a precisely defined angle of pivot of the pivot member.

A locking bolt which passes transversely through the pivot plane of the pivot member is provided as a retaining component which also durably resists the violent stresses of everyday use.

Preferably, the end region of the pivot member has a U-shaped locking aperture which is matched to the diameter or cross-section of the locking bolt. As a result of this matching, the locking bolt is engaged by the end region of the pivot member in the locking position, with circumferential play, as a result of which a correspondingly easy pivoting of the pivot member relative to the locking bolt is possible. Furthermore, the clear cross-section of the elongate locking aperture enlarges to a certain extent in a wedge-shaped manner towards the exit side, in order to bring about automatic centering of the locking member when it dips into the locking aperture.

In order that it should be possible for the lever arm of the locking member, provided with the hook-shaped end region, to be of relatively short design, the pivot member interacts with a retaining component which projects from a main connecting rod, coupled to the top support, in the manner of a parallelogram linkage. In this arrangement, the retaining component and pivot member are so arranged relative to each other that the constrained motion of the connecting rod parallelogram defined by the main connecting rod and the top support is cancelled by the pivot member connection while the connection remains.

Other objects, advantages and novel features of the present invention will become apparent from the following detailed description of the invention when considered in conjunction with the accompanying drawings.

DETAILED DESCRIPTION OF THE DRAWINGS

Figure 1:
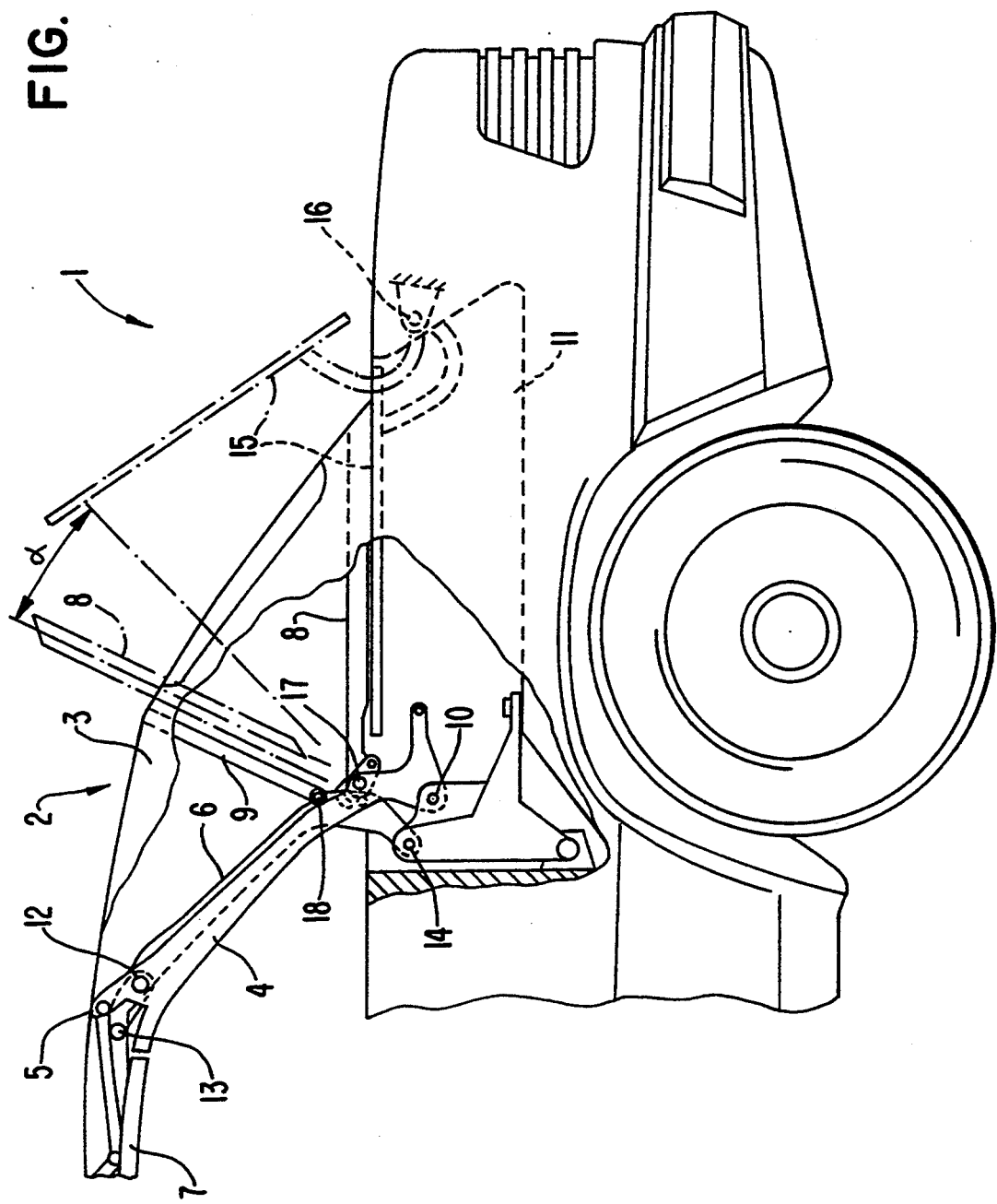
FIG. 1 is a schematic lateral view of a rear region of a convertible car, with the top closed, constructed according to a preferred embodiment of the invention.

In the lateral view according to FIG. 1, a rear region of a convertible car 1 can be seen, with a lowerable folding top 2 which, in a conventional manner, comprises a supporting top frame over which is stretched a flexible top cover 3 of textile fabric of known type.

The top cover 3 of the closed folding top 2 and the side panel of the bodywork are shown partially cut away in FIG. 1 to better illustrate the top frame. The top frame, which is mirror-symmetrical in relation to the longitudinal median plane of the convertible car 1, includes a top support 4 with main strut 5, a main connecting rod 6, a lateral roof frame 7, a rear hoop 8 and a corner strut 9. The lower end of the top support 4 is recessed via a main bearing 10 in the lateral leg of a generally U-shaped top box 11 on the bodywork of the convertible car 1, as a result of which the main strut 5, which connects the top supports 4 to each other, can be pivoted about a horizontal transverse axis of the vehicle. In the upper end region of the top support 4, a rear end of the roof frame 7 is connected to the top support 4 via a hinge joint 12. The roof frame 7 is held in its design position by the assigned main connecting rod 6, whose upper end is articulated via a hinge joint 13 on the roof frame 7, which hinge joint is situated at a distance in front of, and above, the hinge joint 12. The lower end of the main connecting rod 6, which extends approximately parallel to the top support and adjacent to the latter, is attached to the bodywork with a similar vertical offset via a hinge bearing 14 in the top box 11, a bearing bracket of a conventional kind, screwed to the bodywork, serving as a pivot stop. Thus the roof frame 7 is guided in the manner of a parallelogram linkage by the top support 4 and the main connecting rod 6.

The upward-facing aperture of the top box 11 is closed by means of a top box lid 15 of matching shape which rests on the edge of the aperture of the top box 11 and is locked thereto in a manner which is not shown. On the top box lid 15 lies the rear hoop 8 which is likewise U-shaped, forms the lower termination of the top 2 and retains the top cover 3 at the rear. Whereas the top box lid 15 is mounted, behind the top box 11, to be pivotable about an axis 16 fixed to the bodywork, the front ends of the lateral legs of the material retaining hoop 8 are cantilever-mounted on the associated top support 4 via a hinge joint 17, approximately at the height of the upper edge of the body panel. At the rear, the material retaining hoop 8 is fixed to the top box lid 15 by means of a closure arrangement (not shown) and hence held down in its bearing position, as illustrated. Above a rear window integrated into the top cover 3, the corner strut 9 rests supportingly on the underside of the top cover 3 and forms the corner contour of the top 2. The corner strut 9 is mounted on the associated main connecting rod 6 via a hinge joint 18 by the ends of its lateral legs, above the rear hoop 8, as a result of which it is capable of a folding movement relative to the main connecting rods 6.

In order to lower the folding top 2 into the top box 11, the rear hoop 8 and the top box lid 15 are initially unlocked. As is indicated by broken lines, the rear hoop 8 is then swung up about the axis of the hinge joint 17, into an upright intermediate position, after which the top box lid 15, which has been pushed in the opposite direction, can be folded up towards the rear and exposes the upward-facing aperture of the top box.

After the front top closures have been unlocked, the folding top 2 can then be folded back about a main axis defined by the main bearing 10 and lowered into the top box 11, the collapsing of the top frame taking place in a known manner by kinematic constrained motion. The dimensions or arrangement of the top box aperture are such that the main strut 5, supported by the top supports 4, can be swung into the top box 11 without coming into contact with the rear wall of the top box 11.

When the upright top supports 4 are folded back about the main bearing 10, the hinge joints 17 move rearwards and downwards on a circular path corresponding to their distance from the main bearing 10, as a result of which the rear hoop 8 is displaced rearwards relative to the main bearing 10. Furthermore, the rear hoop 8 is folded, when the top 2 is lowered, into a position virtually parallel to the top supports 4, as a result of which the rear hoop 8 is displaced rearwards further than the main strut 5 is lowered. In order that the accommodation space for the rear hoop 8 should be available, the rear wall of the top box 11 slopes obliquely downwards and rearwards. When the top 2 is lowered, the rear hoop 8 projects into this widened portion of the top box 11, lying behind the top box aperture. If, however, the folding top 2 is moved back while the corner hoop 8 is in its upright intermediate position, it does not fit through the top box aperture.

In order to ensure that the rear hoop 8 can dip through the top box aperture without contact, it must instead be folded down from its upright intermediate position about the axis of the hinge joint 17 through a pivot angle α of, in this case, about 20° advance, before it may then be moved back further together with the top supports 4.

This sequence of operations is ensured by a locking mechanism 19 which is arranged in each case on the two lateral top supports 4 and blocks the top supports 4 against being swung rearwards out of their upright position until the rear hoop 8 has been lowered at least into its advance pivot position.

Figure 2:
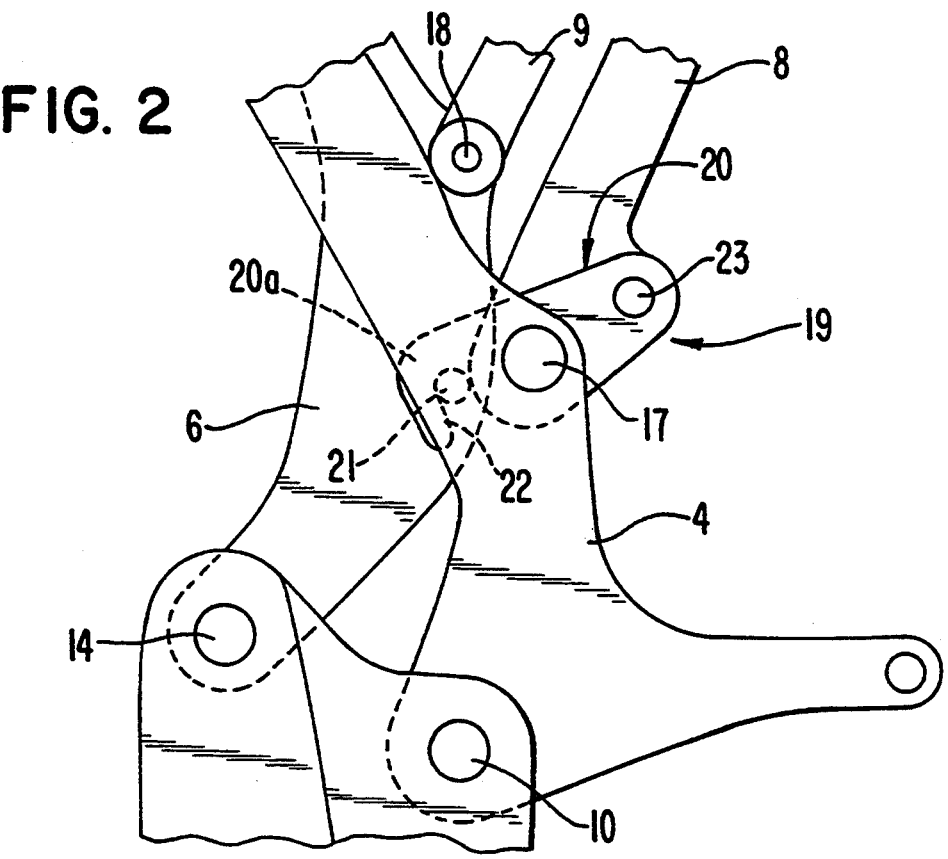
FIG. 2 is a partial schematic view which shows the lever apparatus region of the top with the rear hoop erected.
Figure 3:
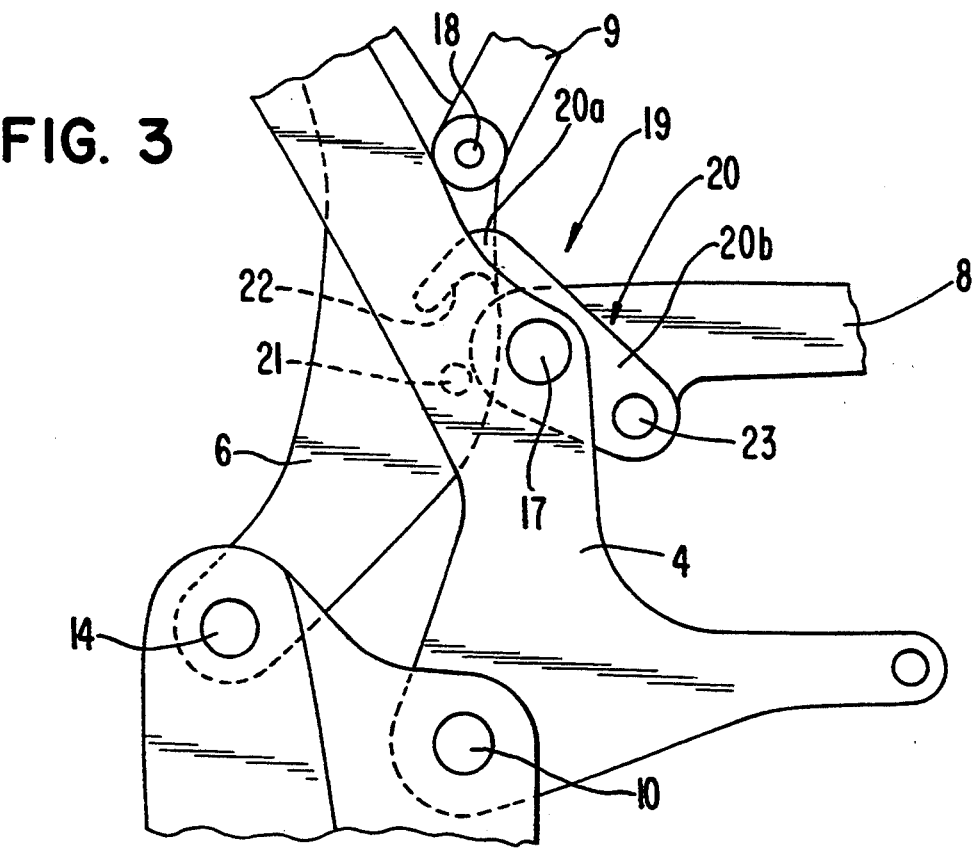
FIG. 3 shows the lever apparatus region of FIG. 2 with the rear hoop lowered.

In FIGS. 2 and 3, this locking mechanism 19 can be clearly seen on the left-hand top support 4, being designed with mirror symmetry to the locking mechanism on the right-hand top support (not shown).

The locking mechanism 19 comprises a pivot member 20, designed as a two-armed lever, which is co-mounted on the top support 4 via the hinge joint 17, in the manner of a rocker arm, its pivot plane extending between the mutually parallel broad sides of the top support 4 and main connecting rod 6. The forward-projecting lever arm of the pivot member 20 is of hook-shaped design in its end region 20a and interacts with a locking member 21, behind which it engages and which, passing transversely through the pivot plane of the pivot member 20, projects from the broad side of the main connecting rod 6 to which it is immovably connected by welding or even by screws. To produce the hook-shaped design of the end region 20a, a substantially U-shaped locking aperture 22 is cut out from the end region 20a, extending approximately tangentially relative to the axis of the hinge joint 17 and having a downward-facing open end. In this arrangement, the clear width of the locking aperture 22 is slightly greater than the diameter of the cylindrical locking member 21, and the open end of the locking aperture 22 is widened in the shape of a wedge.

The rearward-projecting lever arm 20b is connected at its end, via a hinge joint 23, to the leg of the rear hoop 8 extending adjacent to the pivot member 20, as a result of which the pivot member 20 participates synchronously in all the displacements of the rear hoop 8 relative to the top support 4. If a retrofitting solution is discounted, therefore, the pivot member 20 could alternatively be molded on integrally to the associated leg of the rear hoop 8.

On the basis of the design of the locking mechanism 19 as described, the mode of action when the folding top 2 is lowered is as follows:

When the rear hoop 8 is lifted, the pivot member 20 is swung with it synchronously in the anti-clockwise direction, the end region 20a automatically engaging around the locking member 21. When the intermediate position of the rear hoop 8 is reached, the latter is blocked against further pivoting, since the locking member 21 runs up against the end region 20a in the middle region of the locking aperture 22.

While the end region 20a continues to engage around or behind the locking member 21, the top support 4 is blocked against rearward pivoting, since the hook connection between the top support 4 and the main connecting rod 6 prevents its kinematic constrained movement. Not until the rear hoop 8 is folded downwards relative to the top support 4, through the advance pivot angle α, is the locking cancelled, since the locking member 21 is released by the end region 20a and thus the hook connection between the top support 4 and main connecting rod 6 no longer exists. The conventional lowering operation of the top 2 can thus be continued.

Because of the freedom of movement of the locking mechanism 19, no frictional forces arise between the end region 20a and locking member 21, given proper operation, when the latter is folded down, as shown in FIG. 3, into its position resting on the top box lid 15. Instead, the weight of the rear hoop 8 acts to support the folding process, in the same way as in the case of a top without a locking mechanism 19.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Folding top arrangement for a convertible vehicle comprising:

a top storage box for storing a folding top in a top down condition, said top storage box having an upwardly open top aperture, a top frame for supporting a flexible foldable top cover in an in-use top up condition, said top frame including main connecting rods at each vehicle side pivotable about a respective main axis, lateral top supports at each vehicle side pivotal about a respective top support axis spaced from the respective main axis, and a rear hoop having a rear hoop lateral leg at each vehicle side, top frame connecting structure accommodating folding movement of the top frame from the top up condition to the top down condition with movement of the rear hoop lateral legs backward relative to the main axis to project into a rearward widened area of the top box behind the top box aperture, and a locking device for preventing folding back movement of the lateral top supports when the rear hoop is in an upright position and for permitting folding back movement of the lateral top supports in response to an advance rearward pivot movement of the rear hoop about a predetermined angle such that subsequent folding back of the top supports is accompanied by contact-free dipping of the rear top through the top box aperture, wherein the locking device includes a pivot member mounted on the top support which is engageable behind a retaining component and is coupled to a lateral leg of the rear hoop, said pivot member being mounted on the associated lateral top support coaxially with the rear hoop.

2. Folding top arrangement according to claim 1, wherein the pivot member is a two-armed lever whose rearward-projecting lever arm is articulated on the leg of the rear hoop.

3. Folding top arrangement according to claim 1, wherein the pivot member has a hook-shaped end region.

4. Folding top arrangement according to claim 1, wherein said pivot member is configured to be automatically unlocked in response to the advance rearward pivoting movement of the rear hoop about said predetermined angle.

5. Folding top arrangement according to claim 4, wherein the pivot member has a hook-shaped end region.

6. Folding top arrangement according to claim 5, wherein the end region has an approximately U-shaped locking aperture.

7. Folding top arrangement according to claim 5, wherein the pivot member is a two-armed lever whose rearward-projecting lever arm is articulated on the leg of the rear hoop.

8. Folding top arrangement according to claim 1, wherein a locking member which passes transversely through a pivot plane of the pivot member is provided as a retaining component.

9. Folding top arrangement according to claim, wherein the retaining component projects from one of said main connecting rods and interlocks with the top support via said pivot member.

10. Folding top arrangement according to claim 9, wherein an end region of the pivot member has an approximately U-shaped locking aperture.

* * * * *